July 7, 1925. 1,545,306
E. E. CRONENWETH
TIRE CHAIN APPLIER
Filed June 28, 1924  5 Sheets-Sheet 2
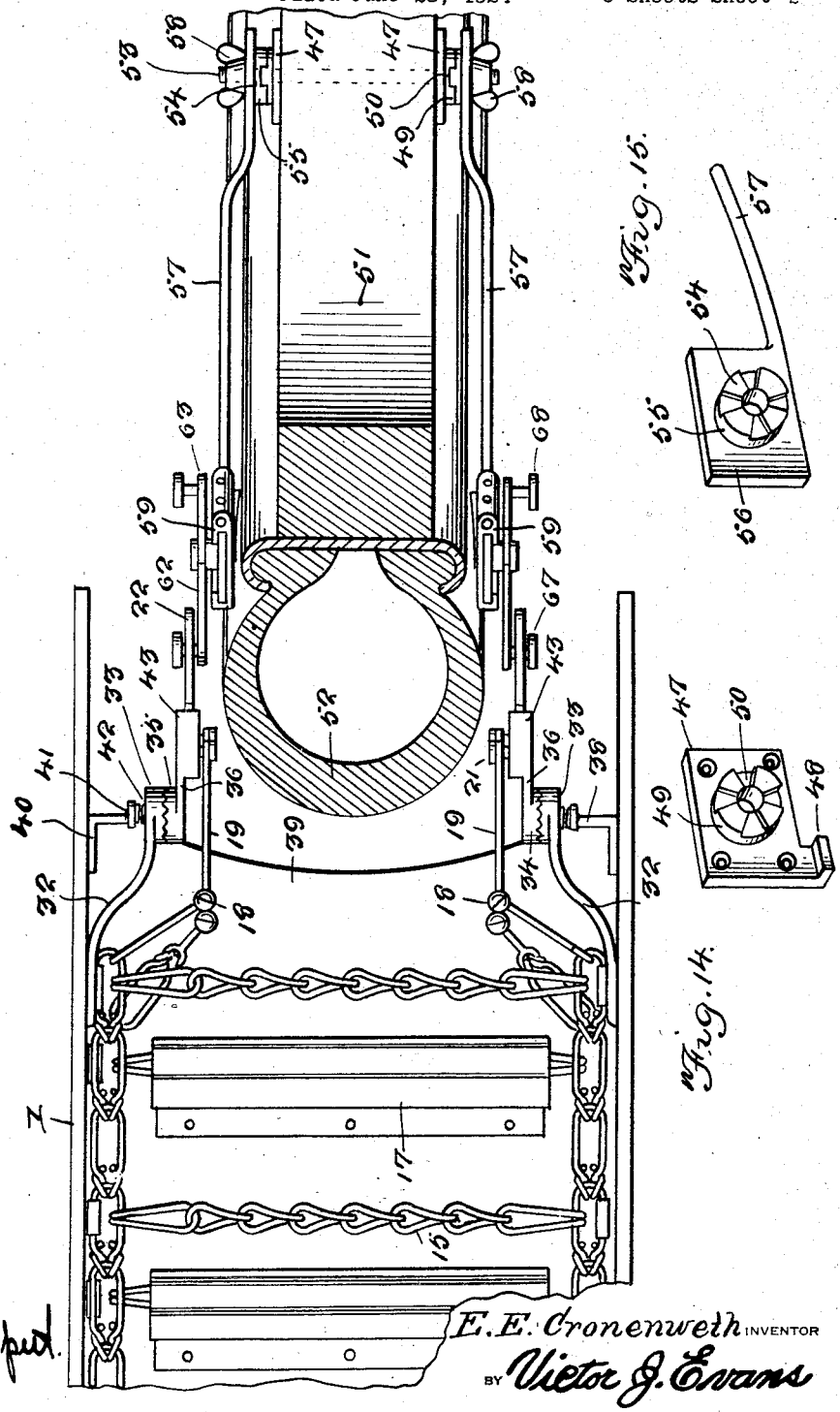

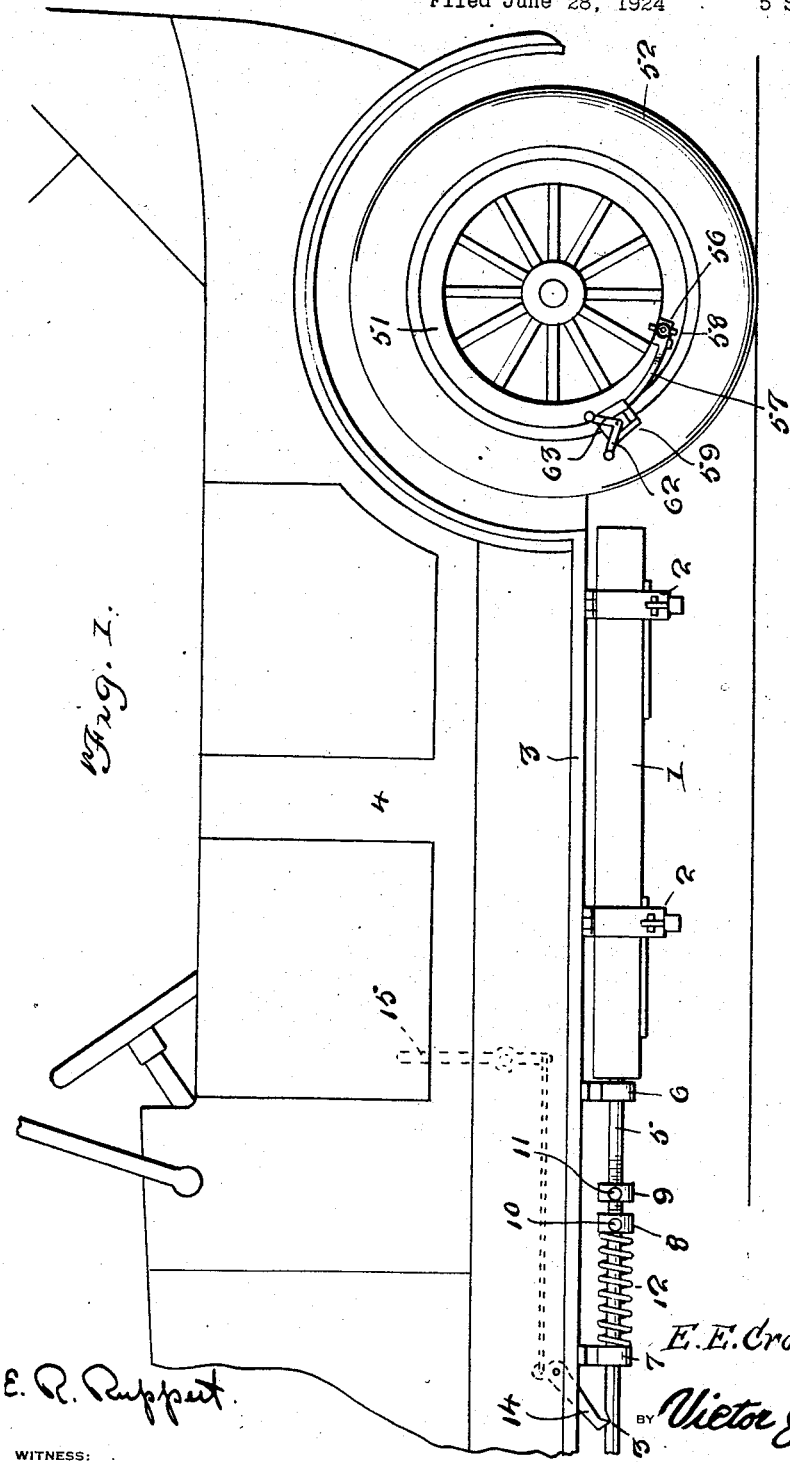

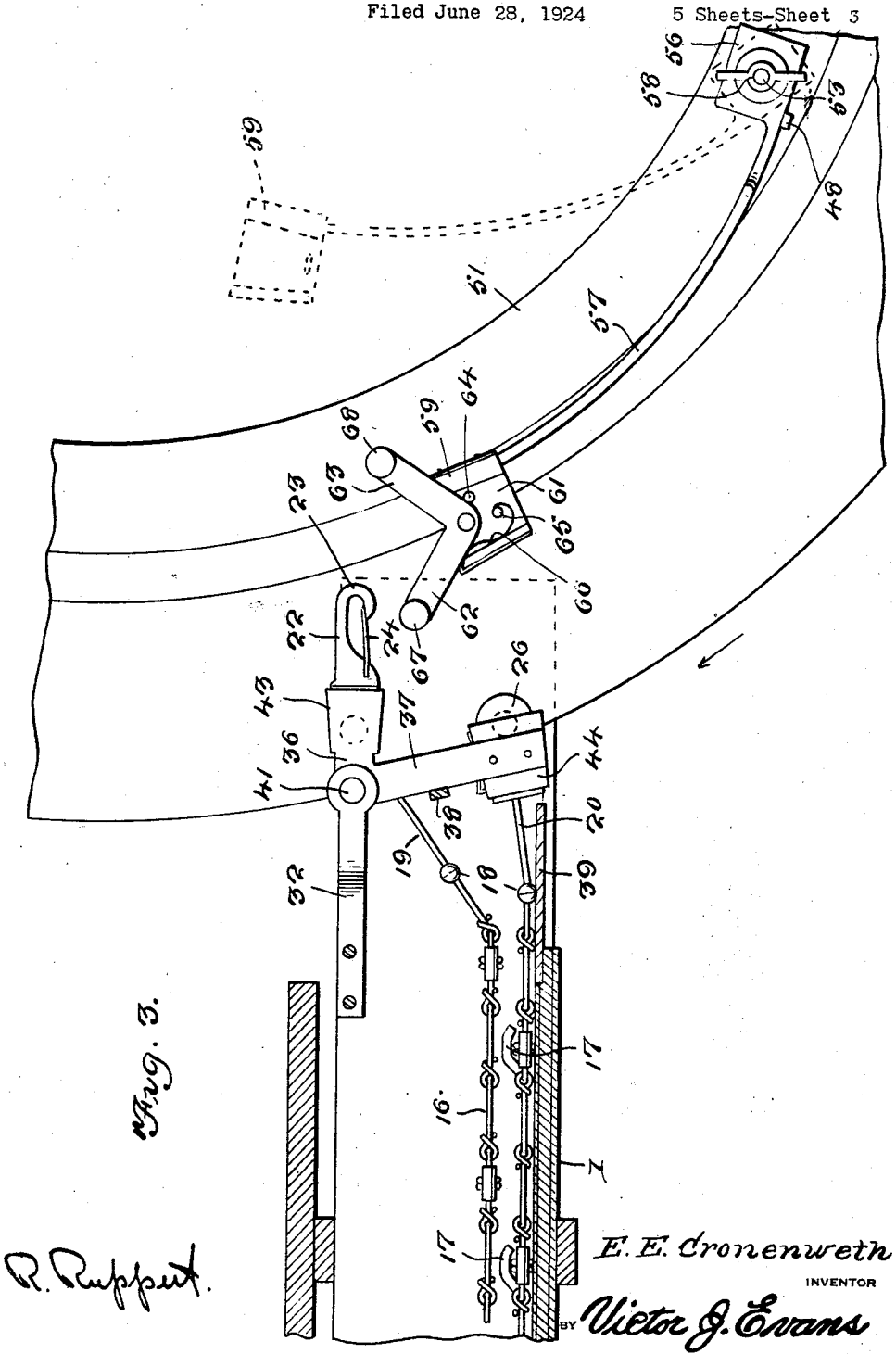

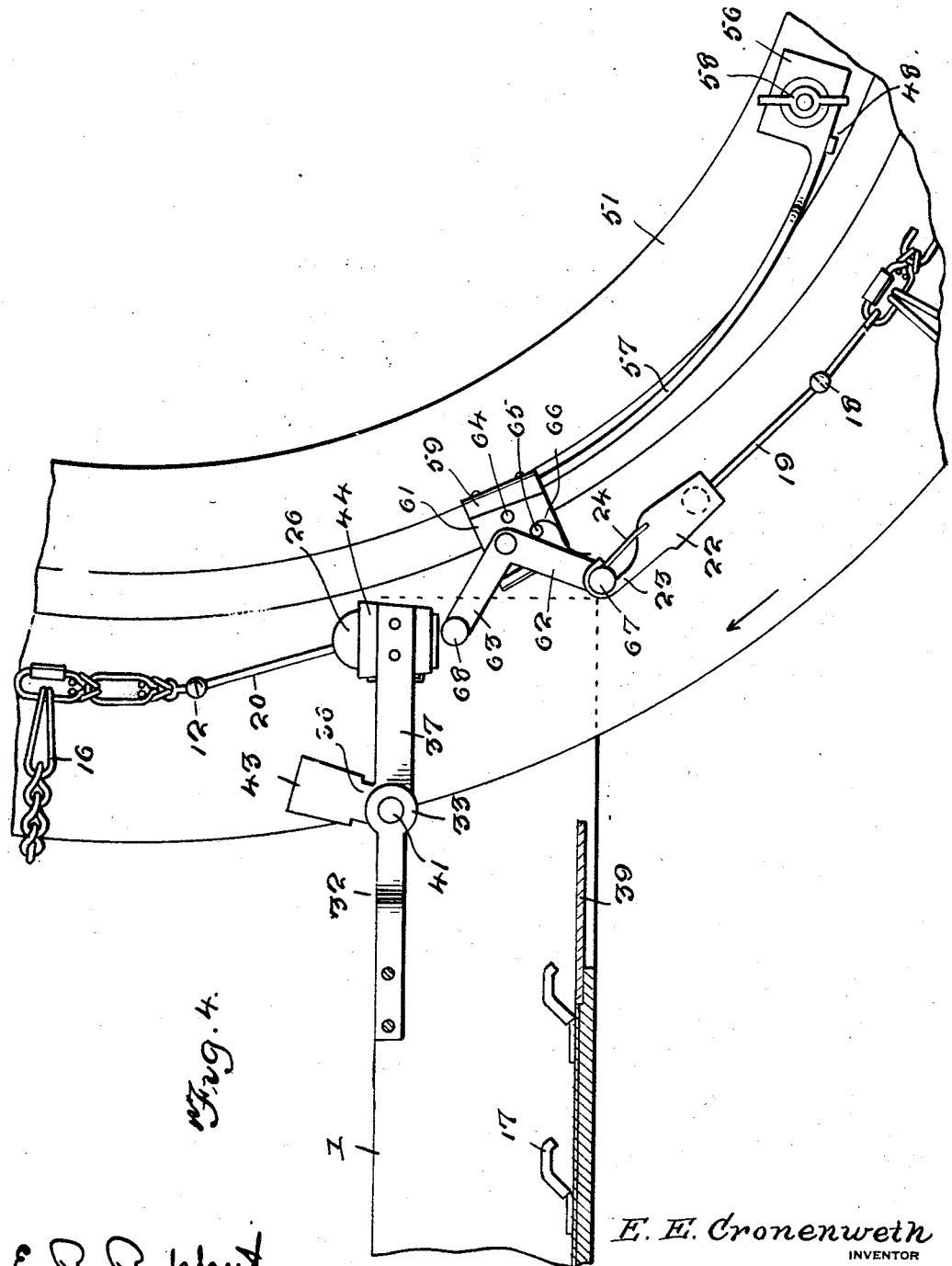

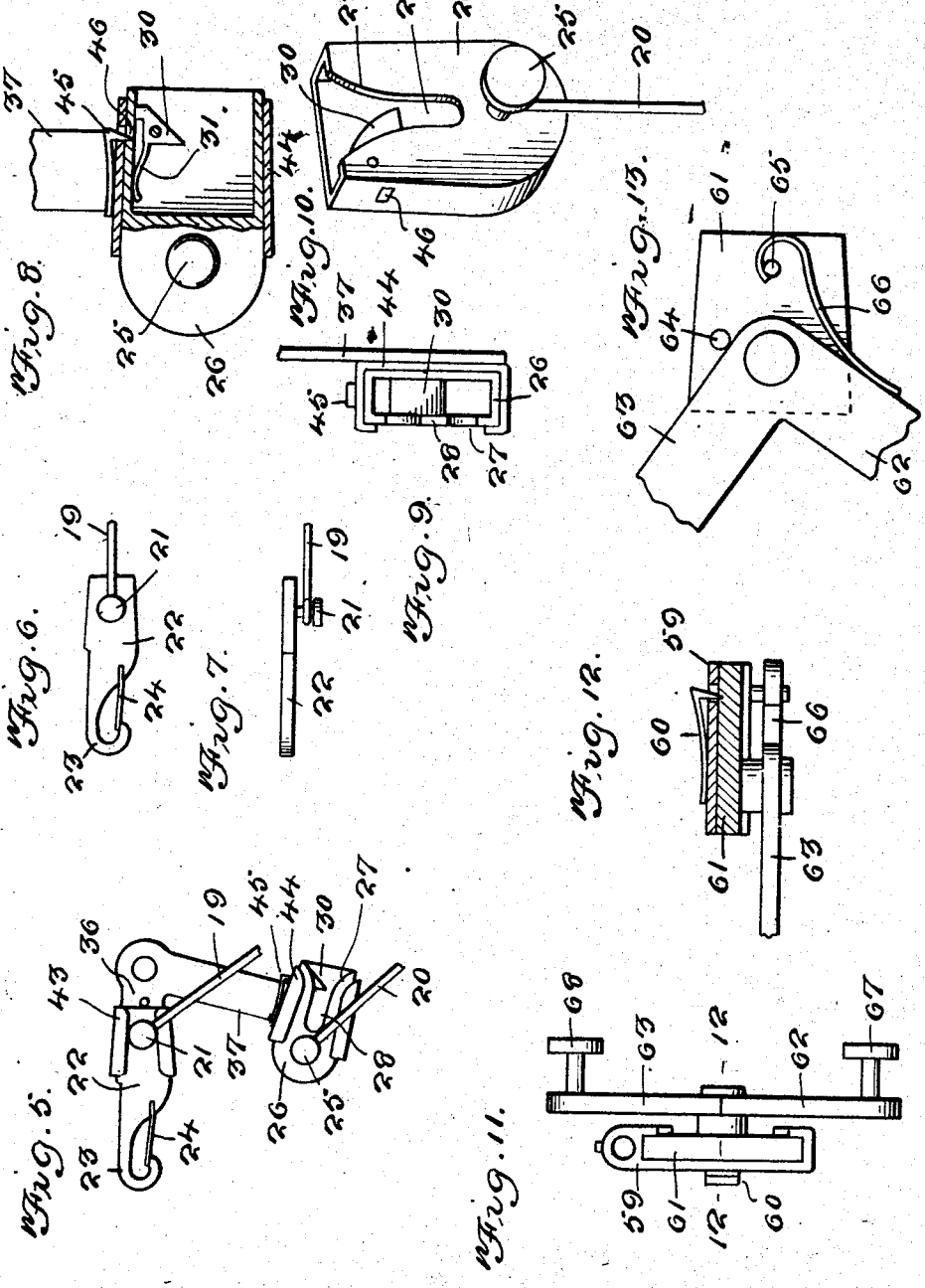

Patented July 7, 1925.

1,545,306

UNITED STATES PATENT OFFICE.

EARL E. CRONENWETH, OF WILKINSBURG, PENNSYLVANIA.

TIRE-CHAIN APPLIER.

Application filed June 28, 1924. Serial No. 723,018.

*To all whom it may concern:*

Be it known that I, EARL E. CRONENWETH, a citizen of the United States, residing at Wilkinsburg, in the county of Allegheny and State of Pennsylvania, have invented new and useful Improvements in Tire-Chain Appliers, of which the following is a specification.

My present invention has reference to a means for automatically arranging around and clamping anti-skid chains to the drive wheels of automobiles.

My primary objects are to simplify and improve the construction disclosed by U. S. Patents No. 1,487,317 granted me on March 18, 1924, and No. 1,511,657, granted me on October 14, 1924.

Other objects and advantages will appear as the nature of the invention is disclosed, reference being had to the drawings which accompany and form part of this application.

In the drawings:—

Figure 1 is a side elevation of an automobile provided with the improvement, the spring arm pivotally secured on the felly of the wheel being thrown to arrange the headed angle lever to chain engaging position.

Figure 2 is a plan view of a portion of the chain housing, and a sectional view through one of the drive wheels of an automobile showing the parts arranged for the application of an anti-skid chain on the wheel.

Figure 3 is a side elevation of a drive wheel of the automobile and a sectional view of a portion of the chain housing, showing the spring arm and the removable headed angle lever carried thereby in the position illustrated in Figure 1, but also showing the chain housing projected and the spring closed hook attached to one end of the anti-skid chain in a position to be engaged by one head on the angle lever.

Figure 4 is a view substantially similar to Figure 3, but showing the chain almost wound around the tire of the wheel and the second headed end of the angle lever about to be received in the mouth of the catch carried by the second end links of the chain.

Figure 5 is an elevation of one of the bell crank levers provided with the sockets for the reception of the hook and the catch and which are pivotally secured on the rods connected to the ends of the anti-skid chain.

Figure 6 is a side elevation of the hook.

Figure 7 is a top plan view thereof.

Figure 8 is an enlarged side elevation of the catch showing the same arranged in the socket on the end of one of the bell crank arms, parts being in section.

Figure 9 is an edge view of the construction disclosed in Figure 8.

Figure 10 is a perspective view of the catch.

Figure 11 is an edge view of the socket end of one of the spring arms which is pivotally associated with the felly of the wheel showing the plate carrying the pivoted headed angle lever arranged therein.

Figure 12 is a sectional view approximately on the line 12—12 of Figure 11.

Figure 13 is a plan view of the plate which carries the headed angle lever, a portion of the latter being shown thereon.

Figure 14 is a perspective view of the plate which is secured to the felly of the wheel.

Figure 15 is a perspective view of the inner portion of the spring arm employed.

As in my referred to patents, I arrange beneath the running boards of an automobile a housing 1 in which is folded an anti-skid chain. The housing is in the nature of a substantially rectangular box that has its forward end closed, its top open and its sides extending a suitable distance beyond the bottom thereof at the rear and open end of the housing. The housing 1 is removably supported on brackets 2 which are clamped on the under face of the running board 3 of the automobile 4. At its forward closed end the housing 1 has secured thereto a rod 5, the same passing through spaced bearing brackets 6 and 7 respectively. The rod 5 is preferably threaded for a portion of its length and has threaded thereon stop collars 8 and 9 respectively. The collars are held positioned by binding elements 10 and 11. Between the forward bracket 7 and the collar 8 there is arranged around the rod 5 a helical spring 12. The rod 5, outward of its bearing 7 is notched, as at 13, and in this notch there is normally received a dog 14 operated by a rod connected with a lever 15 conveniently positioned with respect to the driver. A swinging of the lever will release the rod so that the housing 1 will be projected by the spring 12 rearwardly through its bearing brackets 2, the movement of the housing being limited by the contact of the collar 9 with the bearing 6. The anti-skid chains, broadly indicated by the numeral 16, are folded in the housings in the same manner as are the anti-skid chains arranged in the housing of my referred to patents, the lower leads of the chains having their transverse links engaged by cleats which are shod with rubber, as indicated by the numeral 17. The end links of the anti-skid chains 16 are swively connected, as at 18, to rods 19 and 20 respectively.

The rods 19 for the upper lead of the anti-skid chains are swively connected, as at 21 to the angle body portions 22 of hook members 23. The mouths of the hook members 23 are normally closed by flat springs 24.

The rods 20 for the lower leads of the anti-skid chains are swively connected, as at 25, to catch members 26. Each of the catch members includes a hollow body having a rounded closed end and its edges inclined to its opposite and open end. The side of each of the clamps to which the rods 20 are swively connected is open for a portion of its length, being provided with a flared mouth 27 and a central longitudinal passage 28. The mouth is normally closed by a pivotally supported dog 30 that is influenced by a spring 31.

Secured in the sides of the housing are the ends of inwardly directed offset arms 32. Each arm 32 terminates in a rounded head 33, the outer face of which being roughened or serrated. The serrated faces of the heads are engaged by similar serrations on bosses formed on a hub 34 at the juncture of the arms of bell crank levers. The shorter and normally horizontally disposed arm of each of the bell crank levers is indicated by the numeral 36, the longer arms by the numeral 37. The longer arms have their inner edges normally contacting with plates 38 secured in the sides of the housing above a flexible apron 39 which extends beyond the bottom of the housing. The plates may be formed on brackets 40 secured in the sides of the housing at the open end thereof, the said brackets receiving therethrough the pivots 41 which connect the heads 33 and 35 of the arms 32 and the bell crank levers. On the pivots, between the brackets and the heads 33 there are helical springs 42 for forcing the serrated faces of the heads 33 and 35 into engagement with each other.

The arms 36 and 37 of the respective bell crank levers have at their ends sockets 43 and 44 respectively, the substantially V-shaped socket 43 being formed on the arm 36, while the substantially V-shaped socket 44 being riveted or otherwise secured thereto and being arranged at a rightangle with respect to the longitudinal plane of the arm 37. The outer faces of these sockets are open, and the said sockets are designed to receive therein respectively the angle or V-shaped body 22 of the hook 23 and the angle or V-shaped body of the catch 26. On the top of each of the sockets 44 there is secured one end of a spring dog or hook 45, the beak of which enters through an opening in the said wall of the socket and is received in a notch 46 in the catch member 26.

Secured by bolts, screws or the like, on the opposite side of the felly of each of the drive wheels of the automobile, only one being shown, there are diametrically arranged plates 47. Each of the plates has at one of its corners a depending portion having its end offset to provide a stop flange 48. Each of the plates is centrally formed with a boss 49 and the outer face of each of the bosses is toothed or serrated, as at 50. Each boss has a central opening therethrough, and there may pass through the felly 51 of the wheel 52 a single bolt member 53 which also passes through the openings in the respective bosses 49. The radial toothed or serrated face of the bosses 49 is designed to engage with similar faces 54 on bosses 55 formed on a plate 56 at one end of a spring arm 57. The spring arms 57, it will be noted, are arranged at both sides of the wheel 52 and the bolts 53 are engaged by winged nuts 58 for holding the spring arms at desired positions with respect to the tread surface of the wheel. Normally the spring arms are in the position disclosed by the dotted lines in Figure 3 of the drawings, and each of the arms carries at its outer end a substantially V-shaped socket member 59 whose outer face is partly open. The rear wall of each of the sockets 59 has an opening therethrough for the reception of the head of a spring dog 60. In each of the sockets 59 there is removably secured an angle plate 61. Each of the angle plates is provided with a small depression in which is received the dog 60. Pivotally secured to each of the angle plates 61, adjacent to its widened end there is an angle lever, the arms of which being indicated for distinction by the numerals 62 and 63 respectively. The angle lever is centrally pivoted to the plate 61, and the arms thereof are designed for contacting engagement with stop members 64 and 65 on the said plate 61.

A spring 66 is secured to the inner portion of the stop member or lug 65 and normally contacts with one edge of the arm 62 of the angle lever, forcing the second arm 63 against the stop member or lug 64. This is the initial position of the angle lever when the spring arms 57 have been swung to the positions illustrated in Figures 2 and 3 of the drawings. In the said figures, the lever 15 has been operated to release the spring influenced rod 5 to move the housing rearwardly and to bring the open sides thereof at the opposite side of the tire of the wheel 52. On the outer face and at the ends of the arms 62 and 63 of the angle lever there are secured the shanks of headed elements 67 and 68 respectively. The shanks of the headed elements 67 are in a position to be received in the hooks 23 when the wheels 52 are turned in a reverse or backing direction when the engine is thrown into operation. The wheels thus turn in the direction of the arrows in Figures 3 and 4. The turning of the wheels will first bring the shanks of the headed elements 67 into the hooks 23, and thereafter draw the hooks out of the sockets 43 on the short arms 36 of the bell and crank levers. The pressure thus exerted will swing the angle lever to bring its arm 63 to the position illustrated in Figure 4 of the drawings and to likewise swing the bell crank lever to bring its arm 37 to the position illustrated in the said Figure 4. Thus the shank on the headed element 68 is in a position to be received in the mouth of the catch 26 and to move the catch out of the socket 44 on the longer arm 37 of the bell crank levers. In this manner it will be noted that the chain is automatically applied. In moving the catch members 26 out of the sockets 44 the plates 61 may be moved out of the sockets carried by the spring arms and the thumb nuts may be partly unscrewed to permit of the spring arms being swung to initial position.

Of course, when the anti-skid chains are no longer required for use they are released from engagement with the headed studs on the angle levers and the said chains are rearranged in the housing. The plates carrying the angle levers may be retained in the car until required for use. Thus it will be noted that with my present construction, the only elements remaining on the wheel are the spring arms and the sockets carried thereby and if necessary these arms may be removed so that my present invention obviates the liability of clogging by mud of the parts attached to the wheels set forth in my referred to patents. Aside from this the advantages of my present construction over my referred to patents will, it is thought, be apparent to those skilled in the art to which such inventions relate and a further detailed description is not believed necessary. It should be stated, however, that the outward swinging of the spring arms are limited by contacting engagement with the stops 48 of the plates secured to the felly of the wheel and that such contacting engagement places the spring arms in proper position to receive the angle lever carrying plates in the socket ends thereof, that is, to arrange the arms of the said lever for proper engagement with the hook and thereafter with the socket on the ends of the anti-skid chains.

The inherent resiliency of the arms 57 permit the same being contacted by obstacles without injury, as the same will yield by such contact without breaking and will automatically return to original position.

Having described the invention, I claim:

1. In combination with an automobile and folded anti-skid chains housed thereon forward of the drive wheels thereof, of a means for automatically applying the anti-skid chains to the wheels, comprising bell crank levers having sockets on the ends of the arms thereof, a hook removably arranged in one of the sockets, a catch likewise arranged in the other socket, means connecting the hooks and catches respectively to the end links of the upper and lower leads of the chain, angle levers having headed studs on the ends thereof removably and swingably supported on the sides of the wheels, stop means for limiting the swinging of the angle levers in both directions, spring means influencing the swinging of the angle levers to one position, means for projecting the chains and bell crank levers to bring the hooks to engage the headed studs on one arm of the angle levers when the wheels of the automobile are turned in one direction, to cause the said hooks to be withdrawn from the sockets after the tilting of the bell crank levers and the swinging of the angle levers to bring the headed studs on the second arm thereof to engage in the catches and to withdraw the same from the sockets of the bell crank levers when the chain is wound around the tire.

2. The combination with an automobile having folded anti-skid chains housed forward of the drive wheels thereof, of a means for applying the said chains around the wheels of the automobile upon the turning of the latter, said means comprising bell crank levers each having one of its arms shorter than the other, and each arm having a wedge socket, a clasp hook having a wedge-shaped body received in the socket of the shorter arms, a hollow catch having a wedge body received in the sockets of the longer arms, rods pivotally connected to the body of the hook and to the catch and swivelly connected to the end links of the respective upper and lower leads of the chain, pivotally supported removably sustained angle levers on the sides of the tires of the wheels each having an outstanding stud on the ends of the arms thereof, means limiting the swinging of the angle levers in two directions spring means influencing the swinging of the angle levers in one direction, whereby to arrange one of the arms thereof at an outward angle with respect to the wheel, means for projecting the anti-skid chain to bring the snap hooks in the path of engagement with the headed studs on the last mentioned arms of the angle levers and into such engagement when the wheels are turned, and by virtue of such turning of the wheel to withdraw the hooks from the sockets, to swing the bell crank levers to project the longer arms thereof over the sides of the wheel tread, and to likewise swing the angle levers to bring the headed studs on the second arms thereof in a position to be received in the catches to engage the same and to withdraw said catches from the sockets.

3. The combination with an automobile and folded anti-skid chains housed thereon forward of the drive wheels thereof, of a means for automatically applying the chains to the drive wheels upon the turning of the same in a reverse direction, said means including bell crank levers, brackets supporting the same, interengaging teeth between the brackets and the levers, a yieldable pivot between the brackets and levers, each of said levers having a comparatively normally horizontal arm formed with a wedge socket, means engaging the longer arm of the levers for holding the same from swinging in one direction, a wedge socket on the longer arms of the levers, a snap hook having a wedge body received in the sockets of the shorter arms, a hollow catch having a wedge body received in the sockets of the longer arms, spring influenced dogs holding the catches in the sockets, a spring influenced dog partly closing the entrance to each of the catches, means connecting the snap hooks with the end links of the upper lead of the anti-skid chain, yieldable means connecting the catches with the end links of the lower lead of the anti-skid chain, means for projecting the chains to bring the bell crank levers along the sides of the tires of the wheels, removably sustained pivotally supported angle levers on the sides of the wheel each having a headed outstanding stud on the ends of the arms thereof, spring means influencing one arm of the lever at an outward angle with respect to the wheel, stop means for limiting the swinging of the lever in such direction, stop means for limiting the swinging of the first mentioned arms at a downward angle with respect to the wheels, the headed studs on the first mentioned arms designed to be received in the catch means when the wheels are turned in a reverse direction, to withdraw the same from the sockets, to swing the bell crank levers and to bring the second arms thereof in horizontal position, and likewise to swing the angle levers to bring the headed studs on the second arms thereof in a position to be received in the catches, and to withdraw the catches from the housings when the wheel has made a complete turn and the chain has been applied thereon.

4. In combination with an automobile and folded anti-skid chains carried thereby, said chains having means on the end links thereof removably engaged by turnable elements, and means for projecting the chains to cause the turnable elements to be arranged at and adjacent to the tires of the drive wheels of the automobile, of means carried by the drive wheels to engage the chain for removing the chain from the turnable elements to wind the same around the tires of the drive wheels and to lock the same thereto when the latter are turned in a reverse direction, said means comprising spring arms pivoted to the sides of the fellies of the drive wheels, means for locking the arms at various desired angles on the wheel, angle levers removably carried by the arms, means for limiting the swinging of the levers in two directions, and means on the arms of the levers to first engage with and remove the end links of the upper lead of the chain to swing the turnable elements and to likewise swing the angle levers to bring the means on the second arms thereof to engage with and to remove the end links of the lower lead of the chain from the turnable elements.

5. In combination with an automobile carrying folded anti-skid chains which have means on the end links thereof removably engaged by turnable elements, and means for projecting the chains to arrange the turnable elements adjacent to the sides of the tires of the drive wheels of the automobile, of means carried by the drive wheels for removing the chain from the turntable means and for winding the same around and locking the said chains on the tires, said means including plates having toothed hubs secured to the opposite sides of the felly of the drive wheels, a stop lug on each plate, arched spring arms having a flat-end provided with a toothed hub to engage the serrated hubs of the plates, binding means for adjustably locking the hubs and for sustaining the spring arms at various desired angles on the wheels, a socket member on the outer end of each arm, a wedge plate removably secured therein, a spring dog holding the plate in the socket, an angle lever pivoted to each plate, stop means on the plate for limiting the swinging of the angle levers in two directions, spring means influencing the angle levers to one position to bring one of the arms thereof in a position to engage with and remove the upper leads of the anti-skid chain from the turnable elements to swing the same and remove the chain therefrom and to likewise swing the turnable elements and the angle levers to bring the second arms of the latter to engage with the end links of the lower lead of the chain to remove the same from the said turnable elements and lock the chain around the tire.

In testimony whereof I affix my signature.

EARL E. CRONENWETH.